United States Patent

[11] 3,625,577

[72] Inventor Howard R. Coleman
Elyria, Ohio
[21] Appl. No. 3,873
[22] Filed Jan. 19, 1970
[45] Patented Dec. 7, 1971
[73] Assignee The General Industries Company
Elyria, Ohio

[54] LUBRICANT-RETAINING MEANS
2 Claims, 3 Drawing Figs.
[52] U.S. Cl. ................................................ 308/36.4,
308/134.1
[51] Int. Cl. ...................................................... F16c 33/78
[50] Field of Search .......................................... 308/134.1,
132, 125, 171, 36.1, 36.4; 184/6.18; 123/196 W;
277/25

[56] References Cited
UNITED STATES PATENTS
3,038,764 6/1962 Dimke ........................... 308/36.4
2,602,712 7/1952 Johnston ....................... 308/134.1
3,160,422 12/1964 Enegren ........................ 308/134.1
FOREIGN PATENTS
505,498 5/1939 England ........................ 308/134.1

Primary Examiner—Martin P. Schwadron
Assistant Examiner—Barry Grossman
Attorney—J. H. Slough ABSTRACT: There is disclosed herein a small electric motor having a rotor shaft rotatably mounted adjacent to the ends thereof in self-aligning bearings disposed within lubricant reservoirs and surrounded by lubricating wicks. The rotor shaft has circumferential grooves adjacent to the ends of the bearings surrounded by frustoconical openings. A retainer ring and washer combination is associated with one of said grooves.

PATENTED DEC 7 1971

3,625,577

INVENTOR.
Howard R. Coleman
BY
J. H. BLOUGH
ATTORNEY

3,625,577

LUBRICANT-RETAINING MEANS

This invention relates to lubricating means for a rotatable shaft and more particularly to means for retaining and controlling the lubricant adjacent to the shaft journal.

The invention as herein disclosed is applied to a small, fractional horsepower electric motor having a rotor shaft journaled at the end thereof in spherical type, self-aligning bearings. The bearings are resiliently mounted in lubricant reservoirs containing lubricant supplying medium, and the portions of the shaft adjacent to the ends of the bearings are surrounded by frustoconical splash guards or shields. Circumferential grooves are provided in the shaft within the splash guards, said grooves affording means to collect and stop the flow of lubricant which tends to flow along the shaft. If an excessive amount of lubricant is collected in a groove, the same may be thrown radially outwardly onto the splash guard which opens into the reservoir. If desired, the groove may be provided with a retainer ring supporting an annular washer to assist in containing the lubricant.

The general object of this invention is to provide improved means for retaining and controlling a liquid lubricant adjacent to the journals of a rotatable shaft.

A more specific object of the invention is to provide means for stopping the flow of the lubricant along a rotating shaft.

Another object of the invention is to provide means for collecting the escaping lubricant at a specific point along he shaft.

Yet another object of the invention is to provide means for shielding the motor against lubricant thrown from the shaft by centrifugal force and directing the lubricant back to a lubricant reservoir.

Other objects of the invention and the advantages thereof will be apparent from the following description thereof and the accompanying drawings, in which said drawings.

Figure 1:
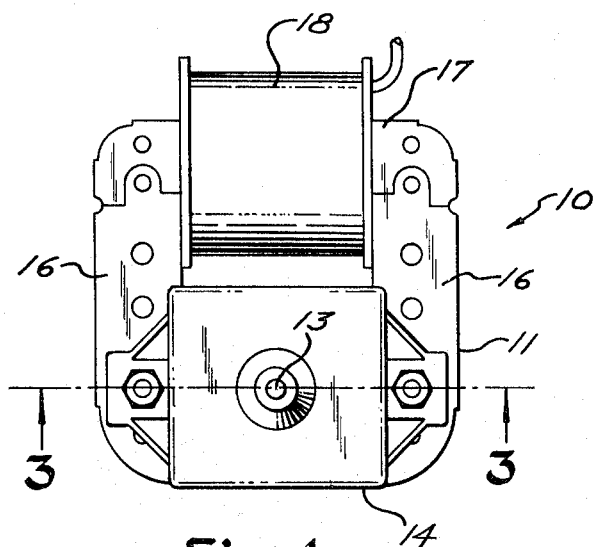
FIG. 1 is a top plan view of an electric motor embodying the present invention.
Figure 2:
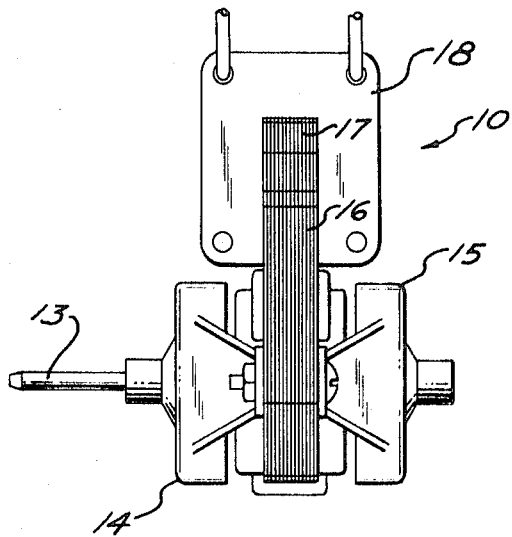
FIG. 2 is a side plan view of the motor of FIG. 1.
Figure 3:
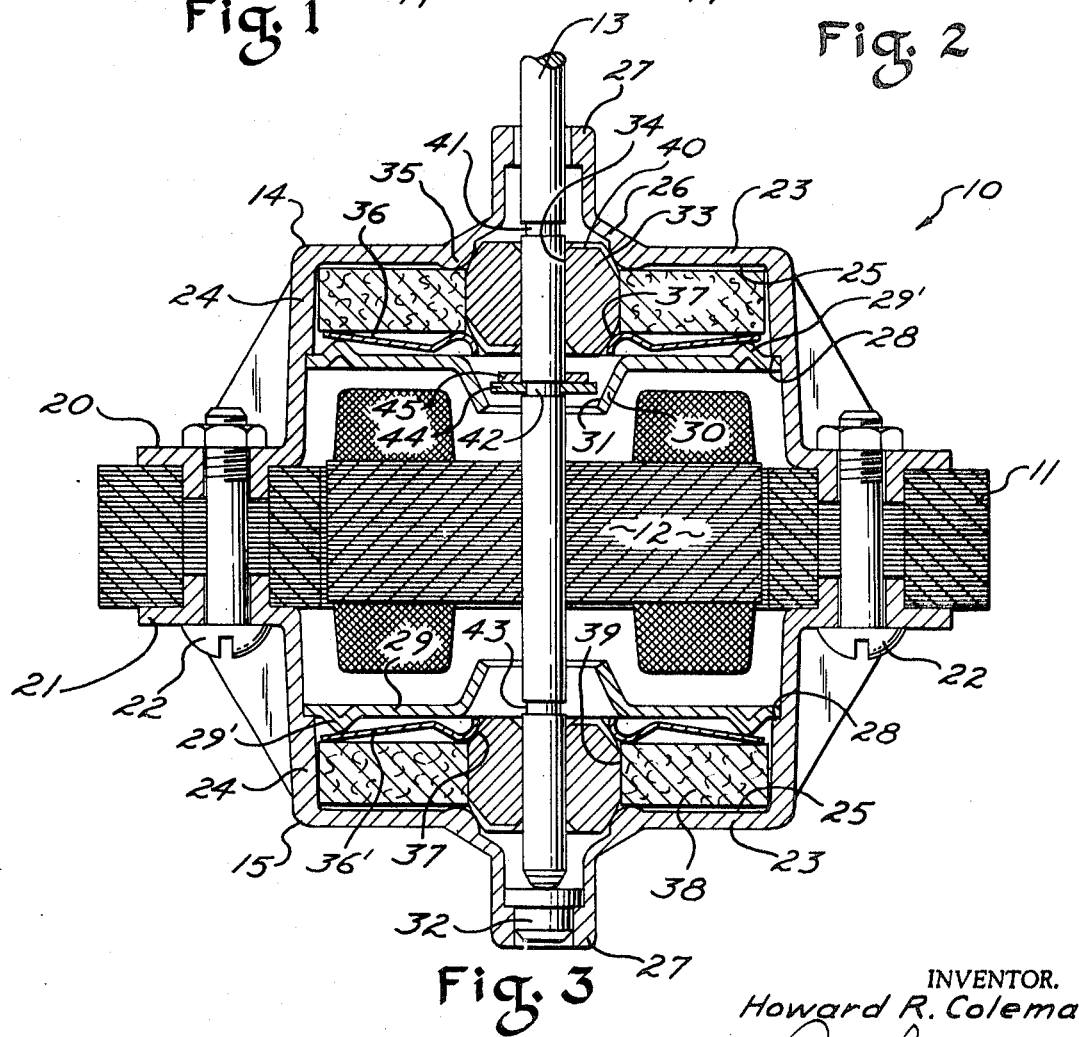
FIG. 3 is an enlarged section taken along the line 3—3 of FIG. 1.

Referring now to the drawings in all of which like parts are designated by like reference numerals, an electric motor 10 comprises a laminated stator 11, a rotor 12 mounted on a rotor shaft 13, and a pair of rectangular bearing brackets 14 and 15 disposed at the upper and lower ends, respectively, of the motor as viewed in FIG. 3. The stator 11 has a pair of laterally projecting arms 16 connected at their distal ends by a core assembly 17 surrounded by a field inducing coil 18. The earing brackets 14 and 15 are provided with laterally projecting mounting portions 20 and 21, respectively, disposed on either side of the laminated stator 11. Bolt and nut assemblies 22 project through suitably aligned openings in the stator and bracket-mounting portions to form a housing for the rotor 12.

The bearing brackets 14 and 15 are substantially identical, each having a rectangular outer wall 23 and inwardly projecting sidewalls 24 which together define a rectangular reservoir 25 for a lubricant. The outer wall 23 has a centrally disposed, outwardly projecting, frustoconical neck 26 terminating in an outwardly projecting collar 27. The sidewalls 24 are provided with an inner shoulder 28 spaced inwardly from the outer wall 23 and providing a seat for a rigidly fixed retainer plate 29 having a frustoconical central neck 30 affording an opening 31 therethrough. The neck 30 projects in the opposite direction with respect to the neck 26, and the rotor shaft 13 projects through the opening 31 and into the collars 27, the upper end of said shaft projecting outwardly beyond the adjacent collar on the upper bearing bracket 14 and the lower end of said shaft seating on a thrust button 32 mounted within the collar 27 of the lower bearing bracket 15.

The shaft 13 is supported at either end by a spherical type bearing 33 having a central bore or opening 34 adapted to rotatably receive said shaft. Each bearing 33 is seated at its outer end against an annular seat 35 integrally formed in the outer wall 23 adjacent to its juncture with neck 26. The inner end of each bearing engages a bearing retainer spring 36 having an annular, protuberant seat 37, of generally semicircular cross section in a radial direction, for receiving the end of the bearing. The bearing retainer spring 36 is also preferably provided with a plurality of radially outwardly projecting, resilient legs 36' which are bent or flexed under tension in the direction of the outer wall 23 by means of an annular boss 29' projecting inwardly of the reservoir 25 from the retainer plate 29. A lubricant supplying medium such as a rectangular, oil-permeable wick 38 is seated within each reservoir 25 between the outer wall 23 and the bearing retainer spring 36. Each wick 38 has a central opening 39 of circular form whereby the wick closely surrounds the associated bearing 33. The bearings 33 are preferably provided at each end with a plurality of radially disposed grooves 40 which extend laterally across the end faces of the bearings and along spherical contracting portions of the bearings adjacent to the ends thereof to afford return flow channels for the lubricant to flow from the shaft 13 back to the wick 38.

The electric motor 10 as herein disclosed and illustrated is disposed on a vertical axis although it will be understood that the present invention may be used with motors having their axes disposed horizontally or at any other desired angle. The rotor shaft 13 is provided with a plurality of rectangular, flat-bottomed, circumferential grooves 41, 42 and 43. Said grooves are all substantially alike except for positioning, the groove 41 being positioned just above the upper bearing 33, the groove 42 being disposed below the bearing, and the groove 43 being disposed just above the lower bearing 33. It will be further noted that the circumferential groove 41 is disposed within the frustoconical neck 26, the groove 42 is disposed within the frustoconical neck 30 of the upper retainer plate 29, and the groove 43 is disposed within the frustoconical neck 30 of the lower retainer plate 29.

In operation of the motor, the wicks 38 within the reservoirs 25 are saturated with a lubricant such as an oil whereby the bearings 33, which are also preferably oil impregnable, are kept constantly lubricated. As the shaft rotates, the oil tends to gather on the shaft 13 and to flow axially in either direction along said shaft. The radial grooves 40 in the ends of the bearings 33 provide one path or series of paths for the oil gathering at the end of the bearing to flow backwardly toward the wick 38 and into the reservoirs 25. However, this outward flow of the lubricant may become excessive in which case said lubricant will collect in the grooves 41–43 and will there be stopped from flowing further along the shaft. The necks 26 and 30 serve as splash guards and return flow means for directing any oil thrown from the shaft by centrifugal force back toward the bearing and toward the reservoir 25. It is anticipated that the grooved shaft means for retaining and collecting the lubricant may be used in conjunction with spherical or other bearings not having the radiating grooves 40, the function of the circumferential grooves 41–43 being independent of the bearing grooves.

It has been found that by positioning the circumferential grooves 41–43 as herein shown adjacent to the motor shaft bearings, escape of oil from the reservoir 25 is substantially eliminated. It has also been found that by providing the frustoconical splash guards in the form of the necks 26 and 30, the lubricant is further inhibited from movement into other parts of the motor.

The groove 42 disposed within the neck 30 of the uppermost retainer plate 29 may further be provided with a radially projecting retainer ring 44 surmounted by a small washer 45. It has been found that the presence of the washer 45 and retainer ring 44 further improves retaining and controlling characteristics of the present invention, especially on the lower side of the bearing where the shaft and said bearing are on a vertical axis and the lubricant tends to flow downwardly by force of gravity.

It will be understood that many changes in the details of the invention as herein described and illustrated may be made without, however, departing from the spirit thereof or the scope of the appended claims.

I claim:

1. In a bearing assembly, a bearing having an axial opening; a rotatable shaft having a journal portion disposed within said opening; means disposed adjacent to said bearing for supplying a liquid lubricant thereto to lubricate said bearing and journal portion; and said shaft having at least one circumferential groove therein disposed adjacent to one end of said bearing to collect and stop the flow of lubricant along said shaft in the axial direction away from said journal portion, said shaft being disposed on a vertical axis; said groove being disposed below said bearing; and a radially projecting retainer ring disposed within said groove.

2. In a bearing assembly as set forth in claim 1: an annular washer disposed above said retainer ring.

* * * * *